United States Patent
Van Der Velde et al.

(10) Patent No.: US 10,206,162 B2
(45) Date of Patent: Feb. 12, 2019

(54) MECHANISMS FOR THE ADDITION OF NEW SYSTEM INFORMATION BLOCK (SIB) TYPES IN TELECOMMUNICATION MESSAGE(S)

(75) Inventors: Himke Van Der Velde, Zwolle (NL); Gert-Jan Van Lieshout, Apeldoorn (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4344 days.

(21) Appl. No.: 10/552,295

(22) PCT Filed: Apr. 2, 2004

(86) PCT No.: PCT/SE2004/000517
§ 371 (c)(1),
(2), (4) Date: Oct. 26, 2006

(87) PCT Pub. No.: WO2004/089013
PCT Pub. Date: Oct. 14, 2004

(65) Prior Publication Data
US 2007/0049344 A1     Mar. 1, 2007

(30) Foreign Application Priority Data
Apr. 3, 2003   (SE) ........................................ 0301027

(51) Int. Cl.
H04W 48/12        (2009.01)
H04W 8/18         (2009.01)
H04W 28/16        (2009.01)
H04W 84/04        (2009.01)

(52) U.S. Cl.
CPC ............ *H04W 48/12* (2013.01); *H04W 8/183* (2013.01); *H04W 28/16* (2013.01); *H04W 84/04* (2013.01)

(58) Field of Classification Search
USPC ........................ 370/252; 455/435.2, 424, 425
See application file for complete search history.

(56) References Cited

U.S. PATENT DOCUMENTS 6,628,946 B1 *   9/2003   Wiberg et al. ................. 455/434
2004/0120265 A1 * 6/2004   Numminen et al. .......... 370/252

OTHER PUBLICATIONS

Universal Mobile Telecommunications System (UMTS);Radio Resource Control (RRC) protocol specification (3GPP TS 25.331 version 5.5.0 Release 5) 2003.*
Serial ATA: High Speed Serialized AT Attachment Aug. 2001.*
The Design and Implementation of an IPv6/IPv4 Network Address and Protocol Translator by Fiuczynski et al., 1998.*
Proposed SMPTE Standard for File Format for Digital Moving-Picture Exchange (DPX), Version 2.0 Sep. 19, 2002.*

* cited by examiner

*Primary Examiner* — Joshua L Schwartz

(57) ABSTRACT

System information is transmitted over an air interface (32) between a node of a telecommunications network and a user equipment unit (30). The system information includes system information blocks which use extended system information block types, e.g., system information block type values which are outside a range of nominal system information block type values. The use of the extended system information block types is facilitated by embodiments of system information extension utility functions at the network node, by method of operating the network nodes, and by corresponding embodiments of system information processing functions provided at the user equipment unit (30).

27 Claims, 13 Drawing Sheets

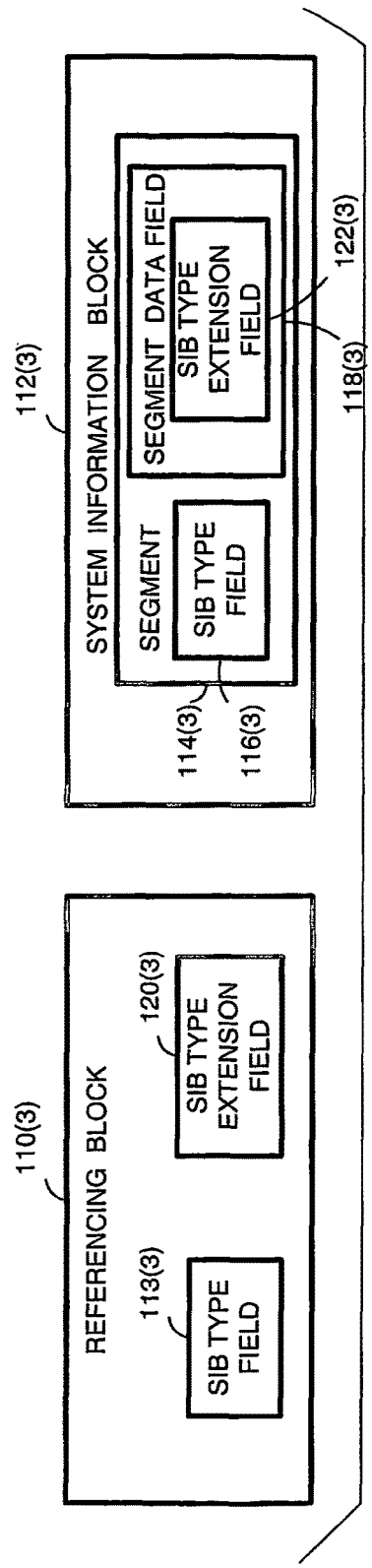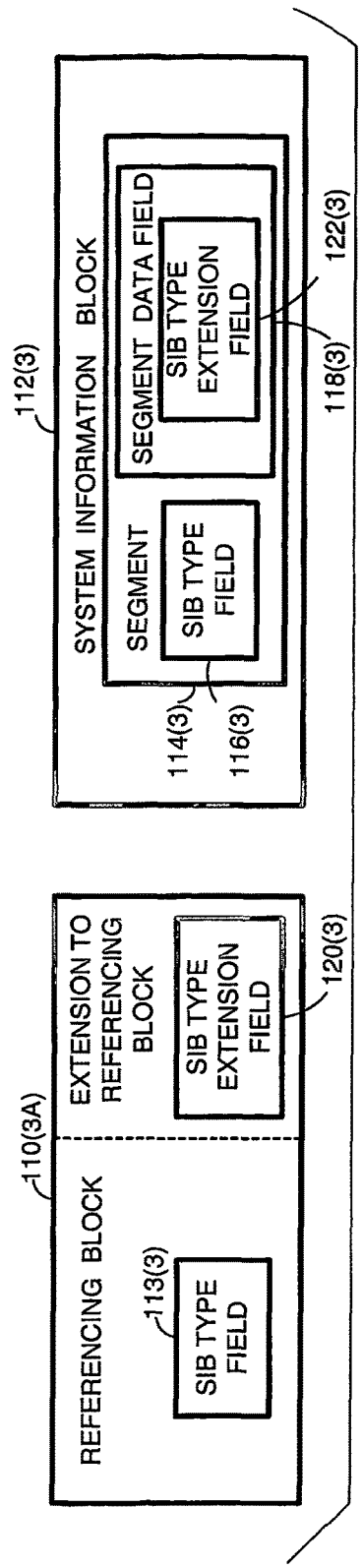

| Information Element/Group name | Value | Comment |
|---|---|---|
| Message type | | SYSTEM INFORMATION |
| SFNprime | | Arbitrary value in range (0..4094 by step of 2) |
| CHOICE Segment combination | Combination 2 | |
| >First Segment | | |
| >>SIB type | "1111" | Reserved for extension |
| >>SEG_COUNT | 2 | |
| >>SIB data fixed extension | | |
| >>>SIB type extension | "000" | SIB 20 |
| | | 219 bits |

Fig. 5

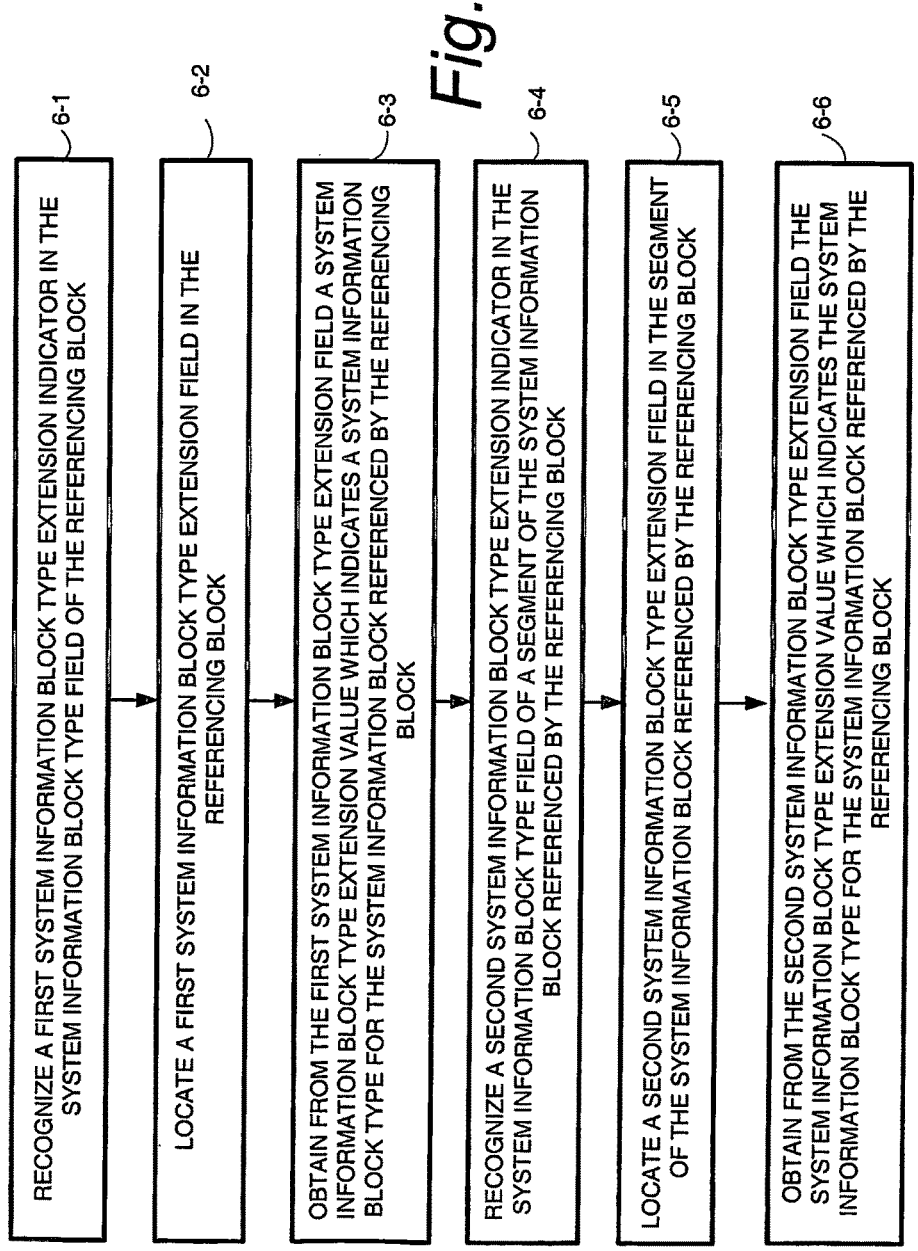

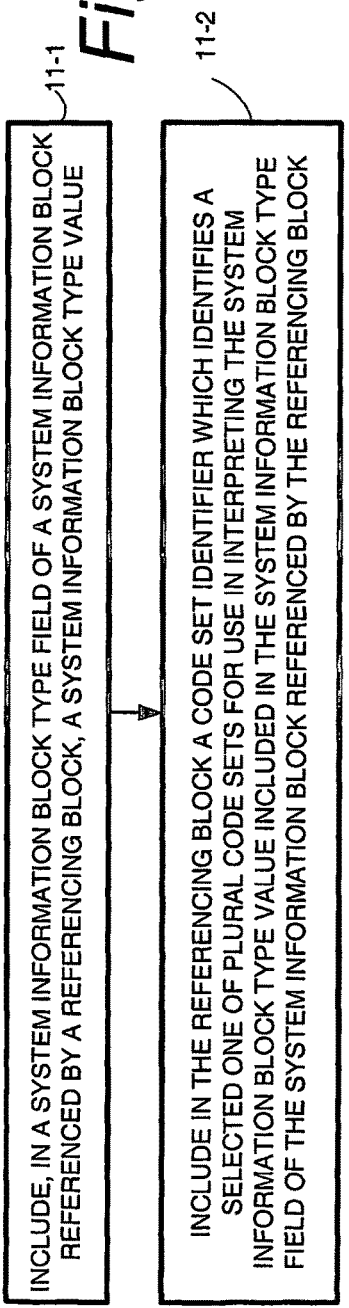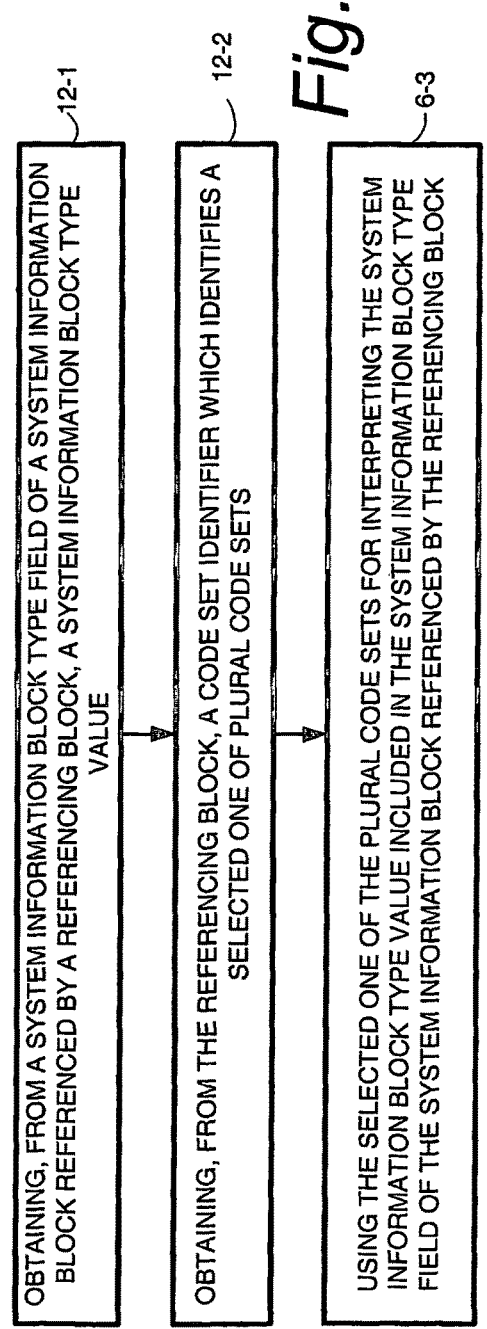

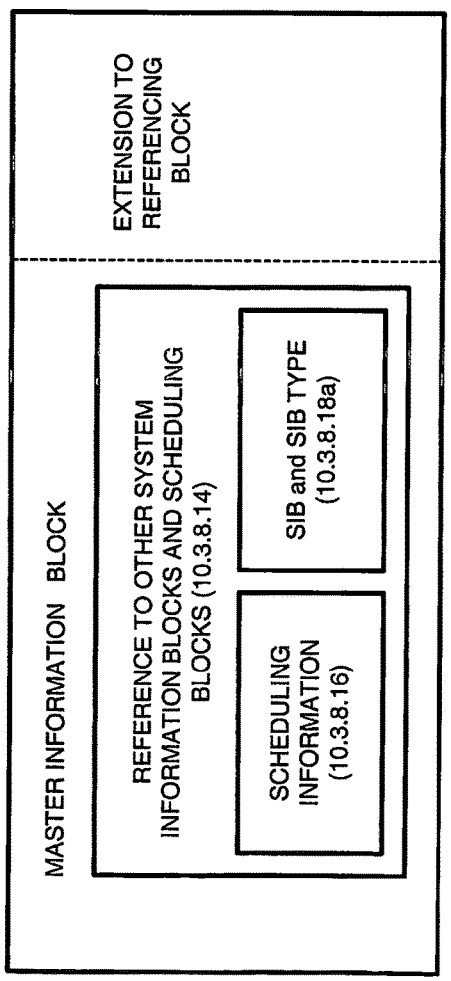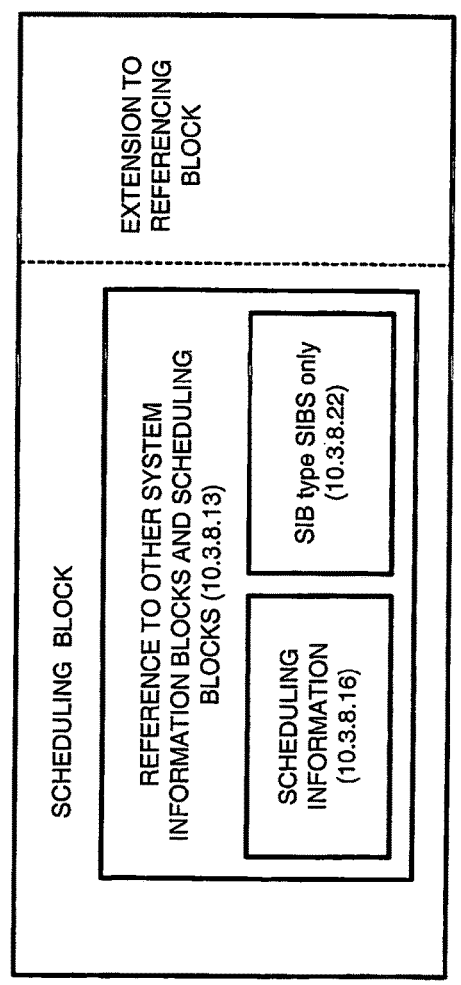

MECHANISMS FOR THE ADDITION OF NEW SYSTEM INFORMATION BLOCK (SIB) TYPES IN TELECOMMUNICATION MESSAGE(S)

BACKGROUND

Field of the Invention

The present invention relates to a specific protocol extension scenario for telecommunications, namely the addition of a new system information block (SIB) type to message(s) transmitted in cellular applications such as, for example, a cellular network that uses Wideband Code Division Multiple Access (W-CDMA).

Related Art and Other Considerations

In a typical cellular radio system, wireless user equipment units (UEs) communicate via a radio access network (RAN) to one or more core networks (CN). The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has various service domains, with an RNC having an interface to these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. The UTRAN (UMTS Terrestrial Radio Access Network) is the part of the network that is responsible for the radio transmission and control of the radio connection. The UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies, and has developed certain technical specifications (TS) relating to standardization efforts.

Other types of telecommunications systems which encompass radio access networks include the following: Advance Mobile Phone Service (AMPS) system; the Narrowband AMPS system (NAMPS); the Total Access Communications System (TACS); the Personal Digital Cellular (PDS) system; the United States Digital Cellular (USDC) system; and the code division multiple access (CDMA) system described in EIA/TIA IS-95.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving RNC (SRNC) and a drift RNC (DRNC), with the SRNC controlling the connection but with one or more diversity legs of the connection being handling by the DRNC. An Inter-RNC transport link can be utilized for the transport of control and data signals between Serving RNC and a Drift RNC. An interface between radio network controllers (e.g., between a Serving RNC [SRNC] and a Drift RNC [DRNC]) is termed the "Iur" interface.

The RNS (Radio Network Subsystem) controls a number of Base Stations in the radio access network. As part of the RNS, the radio network controller (RNC) controls the UTRAN. In fulfilling its control role, the RNC (Radio Network Controller) controls radio resources and radio connectivity within a set of cells. Such resources managed by the RNC include (among others) the downlink (DL) power transmitted by the base stations; the uplink (UL) interference perceived by the base stations; and the hardware situated at the base stations.

The topology of a radio access network can also be conceptualized in areas or units larger than cells. Taking the UTRAN as an example radio access network, a UTRAN Routing Area (URA) is a geographical area comprising one or more cells. Each URA is identified by a unique identity which is broadcast in all cells belonging to the URA. A URA can comprise cells controlled by more than one RNC. A URA with more cells in more than one RNC is overlapping between the RNCs, i.e. an overlapping URA.

As another example from UTRAN, a Location Area (LA) is a geographical area comprising one or more cells. Each LA is identified by a unique identity sent on the broadcast channel, in the same way as the URA. However, a location area is used by the core network to track the location of the UE (in idle mode and in connected mode), while the URA is used by the radio access network to track the location of the UE in connected mode. Typically, a location area is geographically larger than a URA. To each location area there is one of several RNCs having cells in that particular location area. A relationship between location area and RNC is stored in the core network.

Radio access networks typically have a particular signalling protocol employed between the radio access network and the user equipment unit to support the management of radio resources. For example, UTRAN has its Radio Resource Control (RRC) layer 3 signalling protocol. A user equipment unit in the RRC protocol operates in a state model conceptualized as having two modes: an Idle Mode and a Connected Mode. The Idle Mode is entered after power on. In Idle Mode there is no connection between the user equipment unit (UE) and the UTRAN. The least active UEs operate in the idle mode, in which UTRAN is unaware of the presence of the UE. The core network (CN), however, is aware of the Location Area (LA)/Routing Area (RA) in which the UE is located. The UE also informs the CN of changes in LA/RA. Furthermore, in case an incoming call is to be established, the CN initiates paging in all cells comprising the LA/RA in which the UE is registered.

When an RRC connection is established, the user equipment unit (UE) is assigned a U-RNTI and the user equipment unit (UE) enters Connected Mode. In Connected Mode, the RNC in charge of the RRC connection for this UE is denoted as the Serving RNC (SRNC). Within Connected Mode there are four different states (in order of increasing activity level): URA_PCH; CELL_PCH; CELL_FACH; and CELL_DCH. In the first two states the UE is inactive, in the URA_PCH state the UTRAN knows the UE position at the UTRAN Routing Area (URA) level while in CELL_DCH UTRAN knows the UE position at the cell level. In the CELL_FACH state the UE is active but operates on a common channel, which is a channel shared with other UEs. In the CELL_DCH state the UE operates on a dedicated channel which is allocated only for that UE.

In the CELL_DCH state the UTRAN controls the mobility of the UE, i.e. it orders the UE to perform measurements and based on, e.g., those measurements, performs such activities as, e.g., moving the UE to another cell, adding or removing cells from the active set (i.e., the set of cells actively used in the RRC connection). In the other states however, the UE normally decides which cell to move to, although this cell re-selection process is influenced by parameters provided by the network.

To facilitate operations such as those described above, the UTRAN broadcasts or transmits certain "system information" over the air interface which may be relevant for a large number of UEs in a cell. The system information includes information and/or parameters which are formatted into information elements (IEs). The parameters of the information elements (IEs) are utilized for various purposes such as, e.g., to control the cell re-selection procedure for a UE. The broadcast of system information in general is described, e.g., in Technical Specification 3GPP TS 25.331 V3.17.0 (2003-12), Radio Resource Control (RRC) Protocol Specification (Release 1999), e.g., §§ 8.1 et seq.

For various reasons some parameters (IEs) of the system information need to be broadcast more often than other parameters (IEs). For example, some of the parameters (IEs) need to be broadcast more frequently because, e.g., they affect the access delay or because the information changes rapidly. On the other hand, other system information is broadcast less frequently to spare or save the limited radio resources.

To facilitate different scheduling of system information, the system information (e.g., the system information message) is partitioned into a number of different types of system information blocks (SIBs). This partitioning of the system information into system information blocks (SIBs) permits, among other things, transmission of each type of SIB to be scheduled independently and at different time intervals to accomplish the aforementioned objectives. The different types of system information blocks are distinguished by means of a "SIB type" information element.

Thus, the system information elements are broadcast in system information blocks. A system information block groups together system information elements of the same nature. Different system information blocks may have different characteristics, e.g., regarding their repetition rate and the requirements of the UEs to re-read the system information blocks.

As discussed in Technical Specification 3GPP TS 25.331 V3.17.0 (2003-12), Radio Resource Control (RRC) Protocol Specification (Release 1999), e.g., § 8.1.1.1.1, the system information is organized into a tree. In this tree organization scheme, a "master information block" (MIB) gives references and scheduling information to a number of system information blocks in a cell. The system information blocks (SIBs) contain the actual system information. The master information block may optionally also contain reference and scheduling information to one or two "scheduling blocks". These scheduling blocks give references and scheduling information for additional system information blocks. Scheduling information for a system information block may only be included in either the master information block or one of the scheduling blocks.

Typically, a channel known as the broadcast channel is used to transfer system information and thus to carry the system information blocks (SIBs). Unfortunately, the broadcast channel (BCCH) only supports transfer of data units of a fixed size. This can be a problem since many of the system information blocks (SIBs) have a size which exceeds the fixed size of the BCCH. Therefore, in order to support system information blocks with a size exceeding the BCCH limit, a technique known as segmentation is used. Furthermore, to use the broadcast channel (BCCH) efficiently, a concatenation mechanism is provided. These two mechanisms basically operates as follows: (a) system information blocks may be split into a number of different segments, and (b) a number of segments may be concatenated. The concatenation of a number of segments is called a system information message. The segmentation and concatenation of segments for system information blocks (SIBs) are described, e.g., in Technical Specification 3GPP TS 25.331 V3.17.0 (2003-12), Radio Resource Control (RRC) Protocol Specification (Release 1999), e.g., § 8.1.1.1.3. The entire Technical Specification 3GPP TS 25.331 V3.17.0 (2003-12) is incorporated herein by reference.

As indicated above, information about which SIB is broadcast at a certain moment is not only provided within the corresponding segments of a system information block (SIB) but also within the scheduling information that is included in the Master Information Block (MIB) and/or one or more Scheduling Blocks (SBs). Although this facility introduces some redundancy, it also makes the segmentation more robust and makes it possible for the UE to decode SIBs even when its scheduling information is not yet available.

The signalling specified in the existing RRC protocol (e.g., Technical Specification 3GPP TS 25.331 V3.17.0 (2003-12), Radio Resource Control (RRC) Protocol Specification (Release 1999)) also provides two specific mechanisms for the possibility of future extensions or modifications to signalling messages. These future extension mechanisms are described, e.g., in RRC protocol (e.g., Technical Specification 3GPP TS 25.331 V3.17.0 (2003-12), Radio Resource Control (RRC) Protocol Specification (Release 1999) § 10.1.1 et seq. Briefly, one of the mechanisms for future extension of all messages is the critical extension mechanism. The critical message extension mechanism involves the definition of a new version of the message. In the new version of the message the transfer syntax may be completely different from the previous version of the message, except for the initial part that indicates the version. The second of the future extension mechanisms is the non-critical message extension. When the non-critical message extension is used, the transfer syntax of the existing message is just extended with new information. In the non-critical message extension case old receivers will still recognize the entire message apart from the newly introduced extensions.

Since system information messages are broadcast generally, they cannot be directed only towards mobiles that support a certain protocol extension. Consequentially, to maintain backward compatibility, only the non-critical extension message mechanism can be used for system information. Furthermore, for system information the extension mechanism has been defined only at the level of the system information blocks. This means that future extension is neither possible at the level of the segments nor at the level of the system information messages.

In the RRC protocol, the transfer syntax specifies the range of possible information element values for parameters. In some cases this range includes a number of spare values that are reserved for future extension. This is also the case for the message type information element. The RRC protocol (TS 25.331) explicitly specifies that the UE shall ignore broadcast messages (message sent on BCCH) having a type which it does not comprehend. In other words, if the UE receives an RRC message on the BCCH, PCCH, CCCH or SHCCH with a message type not defined for the logical channel type the message was received on, the UE shall ignore the message.

In the future there will certainly be a need to introduce new system information block types within the Radio Resource Control (RRC) protocol as defined within 3GPP TS 25.331. Such new block types will be needed when, in future protocol versions, the system information is extended with information that needs to be scheduled independently using the currently defined flexible scheduling mechanism. One way to add new system information parameters (which will be defined in future) could be to add the new parameters to existing system information blocks. However, simply adding new parameters to existing system information blocks (SIBs) may be problematic if the new parameters have distinct scheduling requirements and/or specific requirements concerning their validity that is different from the system information blocks (SIBs) where they are added. Therefore, most likely it will be preferable to create one or more new system information blocks for these parameters. Creating a new system information block (SIB) will involve creating a new "SIB type" value for the new system information block (SIB), with each newly created SIB type thereby using one of the limited number of spare values defined for the "SIB type" information element.

Moreover, to complicate matters, the "SIB type" information element is actually included in a number of hosting information elements, and the number of spare values reserved for future extension is not necessarily uniform among the hosting information elements (note that one information element can be a component or information element of another (host) information element). For example, the information element "SIB type" is used in different segments, such as the information elements "Complete SIB" & "Complete SIB (short)". Currently, thirty two values have been defined for this "SIB type" when included in these different information element s, of which only two of the values are spare values. On the other hand, the information element "SIB and SB Type" is used in IE "References to other system information blocks and scheduling blocks", which is included in the MIB. Currently thirty two values have been defined for this IE, of which three are spare values. Yet differently, the information element "SIB type SIBs only" is used in the two information elements known as "SCCPCH Information for FACH" and "References to other system information blocks". Currently thirty two values have been defined for this ie, of which five values are spare values. Hence, as seen from the foregoing, the number of spare values is not consistent among the host information elements.

One possible way to extend the SIB type is as follows: (1) use the last spare value to indicate that the SIB type is extended; and (2) add a non critical extension to the message in order to support further extensions in future. For example, if it is desired to add support for an additional seven SIB types, one would need to add a three-bit field. In this case the first thirty one SIB types can be signalled by means of the original SIB type, while SIB type 31 up to 37 can be supported by the non-critical extension. Value 7 ('111'B) of the non-critical extension would then be reserved for further extensions.

However, as mentioned before, future extension for system information is only possible at the level of the system information blocks. This means that the approach proposed in the preceding paragraph only works effectively for the SIB type information elements that are contained in system information blocks. For the SIB type information elements that are included in the segments and in the system information message another approach would clearly be needed.

Thus, at present it is only possible to add one additional SIB using the current extension mechanism. Moreover, due to the lack of extension possibilities at the level of the SYSTEM INFORMATION message and the level of the segments, it is not apparent how additional system information blocks (SIBs) should be introduced.

What is needed, therefore, and an object of the present invention, is techniques or mechanisms for adding additional types of system information blocks (SIBs) to telecommunications transmissions.

BRIEF SUMMARY

Described herein are embodiments of nodes of a telecommunications network which prepare network system information for transmission across an air interface to a user equipment unit; methods of operating such node; and, embodiments of user equipment units which receive and process the system information.

The system information includes a system information block type which is included in protocol blocks. The protocol blocks include a system information block and a referencing block (110). In accordance with one particular kind of protocol, i.e., Radio Resource Control (RRC) protocol, the referencing block (110) is one or both of a master information block and a scheduling block. The protocol blocks in which the system information is included have a system information block type field. The information block type field includes a system information block type value which corresponds to the system information block type. The system information block can comprise one or more segments.

The node embodiments include a system information extension utility function which is arranged to facilitate the use of extended system information block types, e.g., the use of system information block type values which are outside a range of nominal system information block type values.

In one mode and method, the system information extension utility function is arranged and functions to accomplish the following: (1) include a first system information block type extension indicator in the system information block type field of the referencing block when the system information block type for a system information block referenced by the referencing block does not have a system information block type value in a nominal range of system information block type values; (2) include a first system information block type extension field in the referencing block; (3) include, in the first system information block type extension field, a system information block type extension value which indicates a system information block type for the system information block referenced by the referencing block; and (4) include a second system information block type extension indicator in the system information block type field of a segment of the system information block referenced by the referencing block.

Responsive to this mode and method, the user equipment unit includes a system information processing function which is arranged and functions to accomplish the following: (1) recognize the first system information block type extension indicator in the system information block type field of the referencing block when the system information block type for the system information block referenced by the referencing block does not have a system information block type value in a nominal range of system information block type values; (2) locate the first system information block type extension field in the referencing block; (3) obtain from the first system information block type extension field a system information block type extension value which indicates a system information block type for the system information block referenced by the referencing block; and (4) recognize a second system information block type extension indicator in the system information block type field of a segment of the system information block referenced by the referencing block.

As a variation of this mode and method, the system information processing function of the user equipment unit could skip processing the referencing block and essentially process only system information blocks, e.g., read the broadcast information continuously. This is feasible because the SIB type extension information is included in the segments of the system information blocks. In such variation, the system information processing function of the user equipment unit performs only the last three of the above enumerated operations.

In one non-limiting example of the foregoing embodiment and mode, the second system information block type extension indicator can have the same value as the first system information block type extension indicator.

In another mode and method, the system information extension utility function is further arranged and further functions to include a second system information block type extension field in the segment of the system information block referenced by the referencing block; and include in the second system information block type extension field the system information block type extension value which indicates the system information block type for the system information block referenced by the referencing block. Concomitantly, the system information processing function of the user equipment unit for this mode and method locates the second system information block type extension field in the segment of the system information block referenced by the referencing block, and obtains from the second system information block type extension field the system information block type extension value which indicates the system information block type for the system information block referenced by the referencing block.

In yet another mode and method, the system information extension utility function is arranged and functions to accomplish the following: (1) include, in a system information block type field of a system information block referenced by a referencing block, a system information block type value; and (2) include, in the referencing block, a code set identifier which identifies a selected one of plural code sets for use in interpreting the system information block type value included in the system information block type field of the system information block referenced by the referencing block. For example, a first value for the code set identifier can require that the system information block type value be interpreted in accordance with a range of nominal system information block type values for a predetermined protocol, while a second value for the code set identifier can require that the system information block type value be interpreted in accordance with a range of extended system information block type values, the extended system information block type values being outside the range of nominal system information block type values. The code set identifier can be included in an extension field of the referencing block.

In this yet another embodiment and mode, the system information processing function of the user equipment unit performs the following basic actions: (1) obtains, from the system information block type field of a system information block referenced by a referencing block, a system information block type value; (2) obtains, from the referencing block, a code set identifier which identifies a selected one of plural code sets; and (3), uses the selected one of the plural code sets for interpreting the system information block type value included in the system information block type field of the system information block referenced by the referencing block, as well as the (preferably same) the system information block type value included in the system information block type field of the referencing block.

When the protocol blocks belong to a Radio Resource Control (RRC) protocol, the referencing block can be a master information block. In a master information block, the system information block type field is an "SIB and SB type" information element. Alternatively, in the Radio Resource Control (RRC) protocol the referencing block can be a scheduling block. For a scheduling block the system information block type field is an "SIB type SIBS only" information element. For an ordinary system information block, the system information block type field is a "SIB Type" information element.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a diagrammatic view of referencing block and a system information block generated according to a first embodiment and a first mode.

FIG. 3A is a diagrammatic view showing a variation of the referencing block and the system information block of FIG. 3.

FIG. 5 is a diagrammatic view of an example format of a system information block such as the system information block of FIG. 3.

FIG. 6 is a flowchart showing basic example steps performed by a system information processing function of a user equipment unit for processing the referencing block and the system information block of FIG. 3.

FIG. 11 is a flowchart showing basic example steps performed by a system information extension utility function of a network node for generating the referencing block and the system information block of FIG. 10.

FIG. 12 is a flowchart showing basic example steps performed by a system information processing function of a user equipment unit for processing the referencing block and the system information block of FIG. 10.

FIG. 13 is a diagrammatic view of an example format of a master information block.

FIG. 14 is a diagrammatic view of an example format of a scheduling block.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
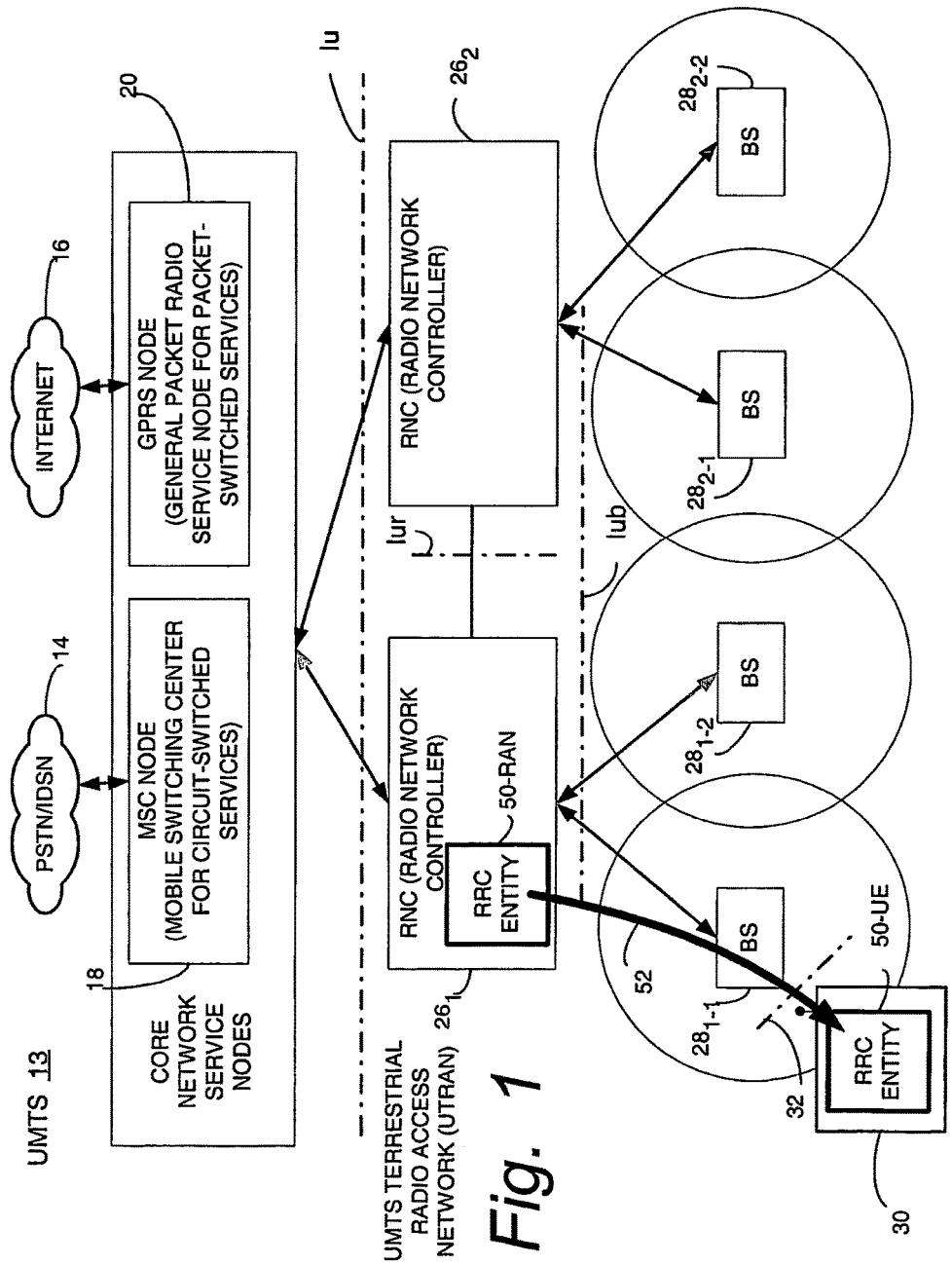
FIG. 1 is a diagrammatic view of an example mobile communications system.

An illustrative, non-limiting example of the radio access network embodiment alluded to above is now described in the context of a universal mobile telecommunications (UMTS) 13 shown in FIG. 1. A representative, connection-oriented, external core network, shown as a cloud 14 may be for example the Public Switched Telephone Network (PSTN) and/or the Integrated Services Digital Network (ISDN). A representative, connectionless-oriented external core network shown as a cloud 16, may be for example the Internet. Both core networks are coupled to their corresponding core network service nodes. The PSTN/ISDN connection-oriented network 14 is connected to a connection-oriented service node shown as a Mobile Switching Center (MSC) node 18 that provides circuit-switched services. The Internet connectionless-oriented network 16 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24. Further, it will be appreciated by those skilled in the art that base station nodes have, in some contexts, more recently become known as Node B or B-nodes.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 1, communicates with one or more cells or one or more base stations (BS) 28 over a radio or air interface 32. Each of the radio interface 32, the Iu interface, the Iub interface, and the Iur interface are shown by dash-dotted lines in FIG. 1.

Figure 2:
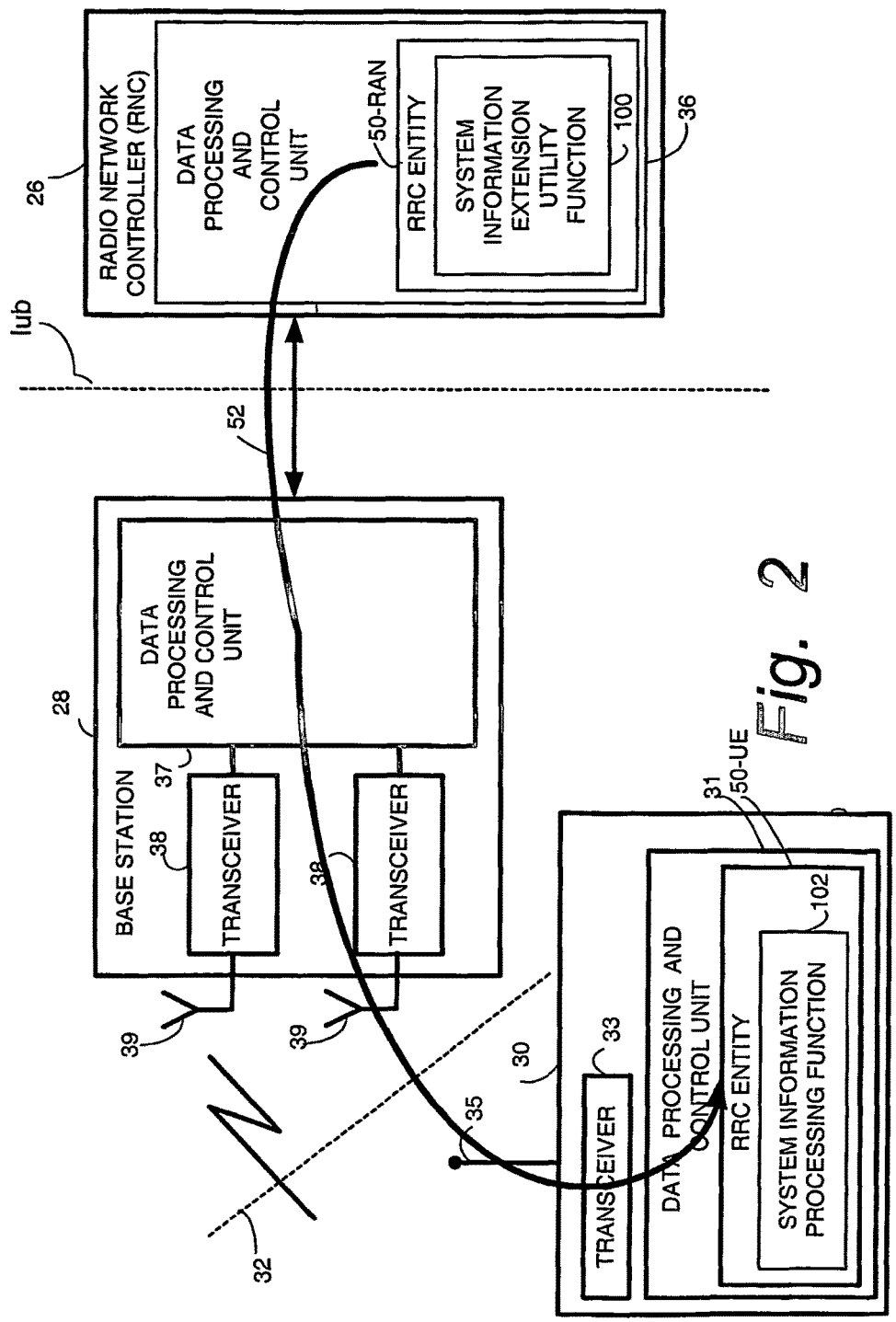
FIG. 2 is a simplified function block diagram of a portion of a UMTS Terrestrial Radio Access Network, including a user equipment unit (UE) station; a radio network controller; and a base station.

FIG. 2 shows selected general aspects of user equipment unit (UE) 30 and illustrative nodes such as radio network controller 26 and base station 28. The user equipment unit (UE) 30 shown in FIG. 2 includes a data processing and control unit 31 for controlling various operations required by the user equipment unit (UE). The UE's data processing and control unit 31 provides control signals as well as data to a radio transceiver 33 connected to an antenna 35. The radio transceiver 33 is a function of the physical layer.

The example radio network controller 26 and base station 28 as shown in FIG. 2 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

Described herein are embodiments of nodes of a telecommunications network which prepare network system information for transmission across an air interface to a user equipment unit, as well as methods of operating such node and embodiments of user equipment units which receive and process the system information. To this end, and generically representing all such embodiments and methods, FIG. 1 shows RNC $26_1$ as including an RRC entity 50-RAN while user equipment unit 30 includes a corresponding RRC entity 50-UE. FIG. 1 further shows that the RRC entity 50-RAN prepares system information which is transmitted in the manner depicted by arrow 52 to the user equipment unit 30 where it is processed by RRC entity 50-UE.

The embodiments of the RRC entity 50-UE described herein facilitate the use of extended system information block types, e.g., the use of system information block type values which are outside a range of nominal system information block type values. For sake of consistency and simplicity, the particular aspect of the RRC entity 50-RAN which facilitates such use of extended system information block types will be referred to as a system information extension utility function and is illustrated by system information extension utility function 100 in FIG. 2. In one example, non-limiting implementation, the system information extension utility function 100 is included as part of the data processing and control unit 36 of radio network controller (RNC) node 26. It will be appreciated that this aspect of RRC entity 50-RAN could be denominated by various other names, such as a system information scheduling function or the like. Moreover, it should be understood that the system information extension utility function 100 can be realized in other ways than as part of the data processing and control unit 36, and that the data processing and control unit 36 is not limited to one particular processor or circuit. For example, the system information extension utility function 100 could be realized by using individual hardware circuits, using software functioning in conjunction with a suitably programmed digital microprocessor or general purpose computer, using an application specific integrated circuit (ASIC), and/or using one or more digital signal processors (DSPs).

In like manner, the aspect of RRC entity 50-UE which detects and processes the extended system information block types is (for simplicity) called a system information processing function and is illustrated as system information processing function 102 in FIG. 2. In the particular example implementation shown, the system information processing function 102 is hosted by the data processing and control unit 31 of user equipment unit 30. This particular name is not limiting, and its variety of possible implementations are similar to those above described with reference to the system information extension utility function 100 of RRC entity 50-RAN.

Below described are three possible, non-limiting, example embodiments and corresponding operational modes for adding new system information blocks. In terms of network and user equipment unit (UE) hardware, each of these embodiments and modes can be described by the generic illustrations of FIG. 1 and FIG. 2. For each embodiment/mode, the system information includes a system information block type which is included in protocol blocks. The protocol blocks include a system information block and a referencing block. In accordance with one particular kind of protocol, i.e., Radio Resource Control (RRC) protocol, the referencing block is one or both of a master information block and a scheduling block. The protocol blocks in which the system information is included have a system information block type field. The system information block type field includes a system information block type value which corresponds to the system information block type. The system information block can comprise one or more segments.

First Embodiment/Mode: Artificial Extension Within SIB-data Field of Segments

An example of the first embodiment/mode is illustrated in FIG. 3, which shows both a referencing block 110(3) and a system information block 112(3) generated by the system information extension utility function 100. Among its various fields, the referencing block 110(3) includes a SIB type field 113(3). The system information block 112(3) is shown as having a segment 114(3). The segment 114(3) includes both a SIB type field 116(3) and a segment data field 118(3). Depending on the particular system information block (SIB) involved, there may be none, one, or more than one segments. For sake of convenience, only one segment 114(3) is shown in FIG. 3 and comparable illustrations referenced herein. Yet it should be understood that operations and/or formatting described herein with respect to one segment can occur with respect to plural segments in a system information block (SIB).

For extended SIB types both within referencing block 110(3) and within the segments 114 the SIB type field 116(3) is set to a special value, e.g., '1111'B, indicating that it concerns an extended SIB type. This special value ensures that the SIB will be ignored by mobiles (e.g., user equipment units) which do not support this extension. Moreover, within the referencing block 110(3) a regular extension is added. This extension includes an additional SIB type extension field 120(3) which is used to distinguish a number of additional SIB types. Within the segments 114(3) a similar additional field is introduced, e.g., SIB type extension field 122(3). As shown in FIG. 3, the SIB type extension field 122(3) is created within the original SIB data field 118(3).

FIG. 3A shows a slight variation of the embodiment of FIG. 3. FIG. 3A shows the SIB type extension field 120(3) as being part of an extension to the referencing block 110(3A). Other embodiments/modes described herein can be comparably varied in the manner depicted in FIG. 3A.

Normally the SIB data field 118 only carries the real payload (part of) a system information block. The format of a system information block (SIB) for the first embodiment is further illustrated FIG. 5. In FIG. 5, the information element "SIB type" corresponds to the SIB type field 116(3); the information element "SIB data fixed extension" corresponds to the segment data field 118(3); and, the information element "SIB type extension" corresponds to the SIB type extension field 122(3).

Figure 4:
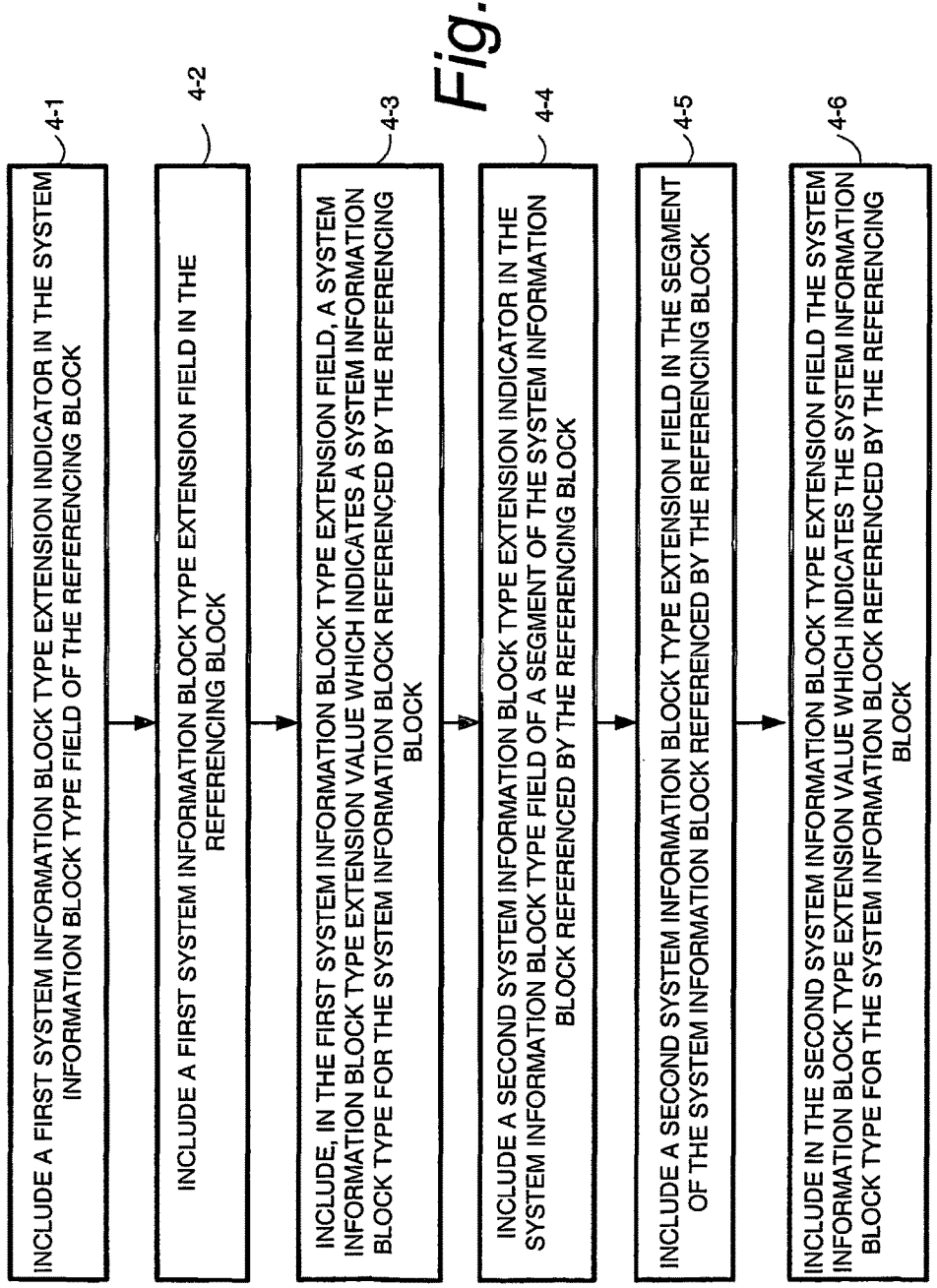
FIG. 4 is a flowchart showing basic example steps performed by a system information extension utility function of a network node for generating the referencing block and the system information block of FIG. 3.

FIG. 4 shows basic, example actions implemented by system information extension utility function 100 in conjunction with the first embodiment/mode. Action 4-1 through action 4-3 are actions performed by system information extension utility function 100 with reference to referencing block 110(3); action 4-4 through 4-6 are performed with reference to system information block 112(3).

As action 4-1 the system information extension utility function 100 includes a first system information block type extension indicator (e.g., the value "1111") in the system information block type field 113(3) of the referencing block 110(3) when the system information block type for a system information block referenced by the referencing block does not have a system information block type value in a nominal range of system information block type values. Then, as action 4-2, the system information extension utility function 100 includes the first system information block type extension field 120(3) in the referencing block 110(3). As action 4-3 the system information extension utility function 100 includes, in the first system information block type extension field 120(3), a system information block type extension value which indicates a system information block type for the system information block (e.g., system information block 112(3)) referenced by the referencing block.

As action 4-4, the system information extension utility function 100 includes a second system information block type extension indicator in the system information block type field 116(3) of the segment 114 of the system information block referenced by the referencing block, i.e., system information block 112(3). Preferably but not necessarily, in one non-limiting example of the foregoing embodiment and mode, the second system information block type extension indicator can have the same value as the first system information block type extension indicator (e.g., "1111").

As action 4-5, the system information extension utility function 100 includes the second system information block type extension field 122(3) in the segment 114 of the system information block referenced by the referencing block, i.e., system information block 112(3). Further, as action 4-6, the system information extension utility function 100 includes in the second system information block type extension field 122(3) the system information block type extension value which indicates the system information block type for the system information block referenced by the referencing block (referencing block 110(3)).

FIG. 6 shows basic example steps performed by a system information processing function 102 of user equipment unit 30 for processing the referencing block 110(3) and the system information block 112(3) of FIG. 3. Action 6-1 through action 6-3 are performed by system information processing function 102 with reference to referencing block 110(3); action 6-4 through 6-6 are performed with reference to system information block 112(3).

As action 6-1, the system information processing function 102 recognizes the first system information block type extension indicator in the system information block type field 113(3) of the referencing block 110(3) when the system information block type for the system information block referenced by the referencing block does not have a system information block type value in a nominal range of system information block type values. As action 6-2 the system information processing function 102 locates the first system information block type extension field 120(3) in the referencing block 110(3). As action 6-3 the system information processing function 102 obtains from the first system information block type extension field 120(3) a system information block type extension value which indicates a system information block type for the system information block referenced by the referencing block, i.e., system information block 112(3).

As action 6-4 the system information processing function 102 recognizes a second system information block type extension indicator in the system information block type field 116(3) of the segment 114 of the system information block referenced by the referencing block, i.e., system information block 112(3). Then, as action 6-5, the system information processing function 102 locates the second system information block type extension field 122(3) in the segment of the system information block referenced by the referencing block. As action 6-6 the system information processing function 102 obtains from the second system information block type extension field 122(3) the system information block type extension value which indicates the system information block type. The system information processing function 102 can then process the system information block 112(3) in accordance with its type.

Figure 6A:
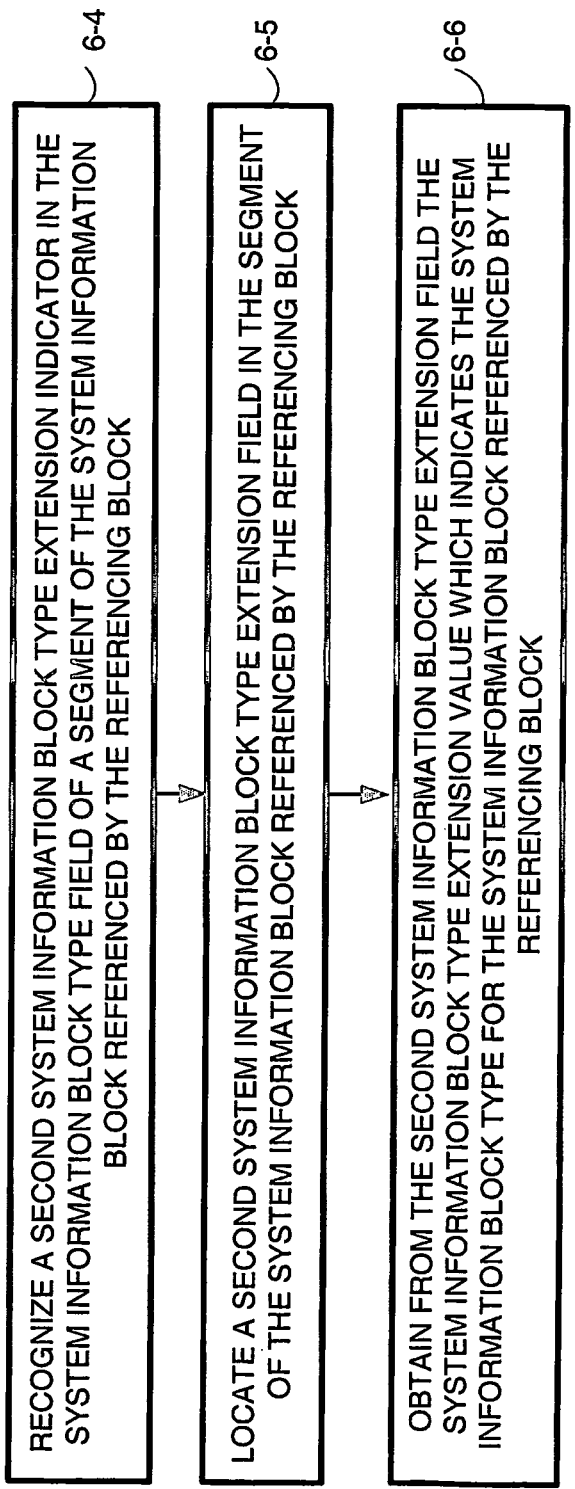
FIG. 6A is a flowchart showing a variation of the processing steps of FIG. 6 performed by a system information processing function of a user equipment unit

As a variation of the first embodiment/mode, the system information processing function of the user equipment unit could skip processing the referencing block and essentially process only system information blocks, e.g., read the broadcast information continuously. This is feasible because the SIB type extension information is included in the segments of the system information blocks and can be used to decode the information. Such variation is illustrated in FIG. 6A, wherein the system information processing function of the user equipment unit performs only action 6-4, action 6-5, and action 6-6, all as understood with reference to the FIG. 6 description thereof. In other words, in this variation actions 6-1 through 6-3 (e.g., the reading/processing of the referencing block) are not performed by the system information processing function of the user equipment unit.

For the first embodiment/mode, receivers not supporting the extension will just ignore segments corresponding with extended SIB types (based on the value '1111'B within the SIB-type field). This means that the first embodiment/mode is fully backwards compatible.

Receivers supporting the extensions should be able to decode the SIB data and know that the first bits actually concern the SIB type extension. This can be done by making the IE SIB type extension conditional on the value of SIB type; it is included if SIB type has value "Reserved for extension".

The foregoing can be implemented in the language which is utilized for making abstract notation for the particular protocol involved. In the Radio Resource Control (RRC) protocol the Abstract Syntax Notation One (ASN.1) language, an ITU standard, is utilized. See, ITU-T Recommendation X.680 (December 1997) "Information Technology—Abstract Syntax Notation One (ASN.1): Specification of Basic Notation; and ITU-T Recommendation X.681 (December 1997) "Information Technology—Abstract Syntax Notation One (ASN.1): Information Object Specification. In the ASN.1, the foregoing can be implemented as follows:

```
FirstSegment ::=                    SEQUENCE {
  -- Other information elements
    sib-TypeAndFirstSegment           SIB-TypeAndFirstSegment
}
SIB-TypeAndFirstSegment ::=         CHOICE {
  MasterInformationBlock              NormalFirstSegment,
  systemInformationBlockType1         NormalFirstSegment,
  systemInformationBlockType2         NormalFirstSegment,
  systemInformationBlockType3         NormalFirstSegment,
  systemInformationBlockType4         NormalFirstSegment,
  systemInformationBlockType5         NormalFirstSegment,
  systemInformationBlockType6         NormalFirstSegment,
  systemInformationBlockType7         NormalFirstSegment,
  systemInformationBlockType8         NormalFirstSegment,
  systemInformationBlockType9         NormalFirstSegment,
  systemInformationBlockType10        NormalFirstSegment.
  systemInformationBlockType11        NormalFirstSegment.
  systemInformationBlockType12        NormalFirstSegment,
  systemInformationBlockType13        NormalFirstSegment,
  systemInformationBlockType13-1        NormalFirstsegment,
  systemInformationBlockType13-2        NormalFirstSegment,
  systemInformationBlockType13-3        NormalFirstSegment,
  systemInformationBlockType13-4        NormalFirstSegment,
  systemInformationBlockType14        NormalFirstSegment,
  systemInformationBlockType15        NormalFirstSegment,
  systemInformationBlockType15-1        NormalFirstSegment,
  systemInformationBlockType15-2        NormalFirstSegment,
  systemInformationBlockType15-3        NormalFirstSegment,
  systemInformationBlockType16        NormalFirstSegment,
  systemInformationBlockType17        NormalFirstSegment,
  systemInformationBlockType15-4        NormalFirstSegment,
  systemInformationBlockType18       NormalFirstsegment,
  schedulingBlock1                    NormalFirstSegment,
  schedulingBlock2                    NormalFirstSegment,
  systemInformationBlockType15-5        NormalFirstSegment,
  systemInformationBlockType19       NormalFirstSegment,
  reservedForExtension                ExtendedFirstSegment
}
ExtendedFirstSegment ::= SEQUENCE {
  -- Other information elements
    seg-Count                         SegCount,
    sib-TypeExt                       SIB-TypeExt,
    sib-Data-fixed2                   SIB-Data-fixed2
}
NormalFirstSegment ::= SEQUENCE {
```

-continued

```
-- Other information elements
    seg-Count              SegCount,
    sib-Data-fixed         SIB-Data-fixed
}
```

It should be noted that the scheduling of system information has been optimised so that in case a segment takes an entire transfer block (TB) no size information is included. This is implemented by means of separate values for the CHOICE parameter "Segmentation combination". This has resulted in a large number of ASN.1 definitions, mainly for the purpose of size optimization. The use of the above approach would not only significantly increase the large number of ASN.1 lines but also further increases the scheduling complexity (since the number of payload bits is different for an extended SIB due to the additional SIB type extension field).

The previously mentioned significant increase in ASN.1 lines could be avoided by not explicitly reflecting in the ASN.1 the presence of the SIB-TypeExt at the start of SIB-Data, e.g., by just inserting a comment. However, this also involves inclusion of additional SIB-type information in every segment, which implies that the overhead increases.

Figure 7:
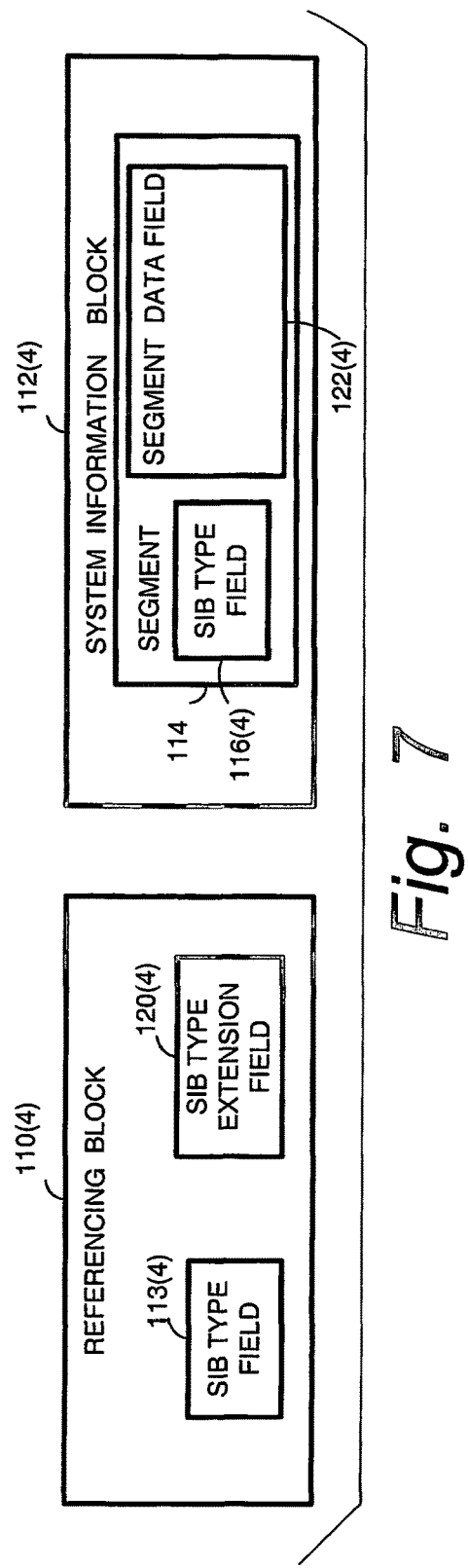
FIG. 7 is a diagrammatic view of referencing block and a system information block generated according to a second embodiment and a second mode.

Second Embodiment/Mode: Extended SIB-type Details Only in Scheduling Information An example of the second embodiment/mode is illustrated in FIG. 7, which shows both a referencing block 110(4) and a system information block 112(4) generated by the system information extension utility function 100. Fields which are common with the embodiment of FIG. 3 are comparably numbered (with the exception of parenthetical suffixes) and comparably understood with reference to the embodiment of FIG. 3.

In the second embodiment/mode of FIG. 7, for extended SIB types both within the referencing block 110(4) and within the segments 114 of the system information block 112(4) the SIB type is set to a special value, e.g., '1111'B, indicating that it concerns an extended SIB type. In particular, both the SIB type field 113(4) of referencing block 110(4) and the SIB type field 116(4) of the system information block 112(4) are set to the special value. This ensures that the system information block 112(4) will be ignored by mobile stations (e.g., user equipment units (UEs)) which do not support this extension. Within the referencing block 110(4) a regular extension is added including the additional SIB type extension field 120(4), which is used to distinguish a number of additional SIB types. For instance, in case three bits are reserved for the SIB type extension field 120(4), an additional seven SIB types can be supported. In contrast to the first embodiment/mode, no such additional field is introduced with system information block 112(4). In other words, the second embodiment/mode differs from the first in that system information block 112(4) does not have a SIB type extension field 122(4).

Figure 8:
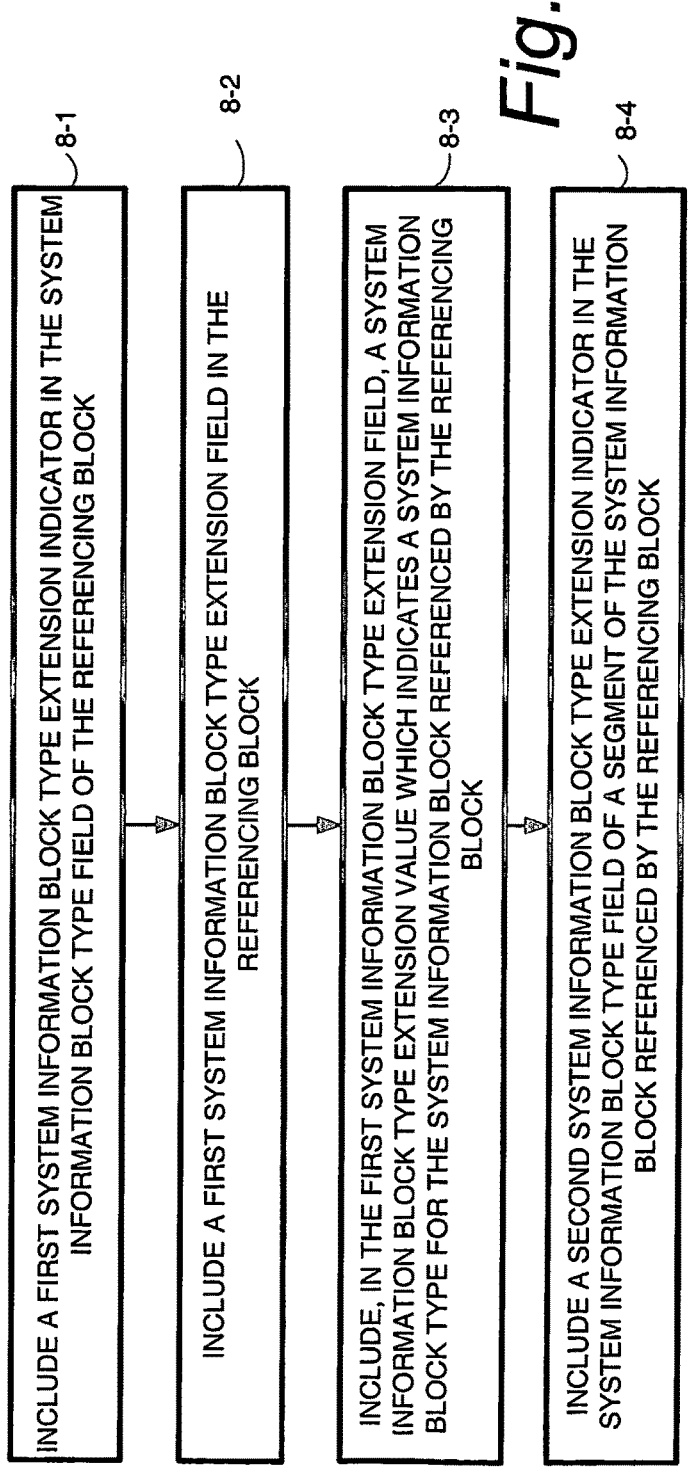
FIG. 8 is a flowchart showing basic example steps performed by a system information extension utility function of a network node for generating the referencing block and the system information block of FIG. 7.

FIG. 8 shows basic, example actions implemented by system information extension utility function 100 in conjunction with the second embodiment/mode. Action 8-1 through action 8-4 of FIG. 8 are essentially the same as action 4-1 through action 4-4 of FIG. 4, and accordingly are not discussed herein. FIG. 8 omits any actions corresponding to actions 4-5 through 4-6 of FIG. 4.

Figure 9:
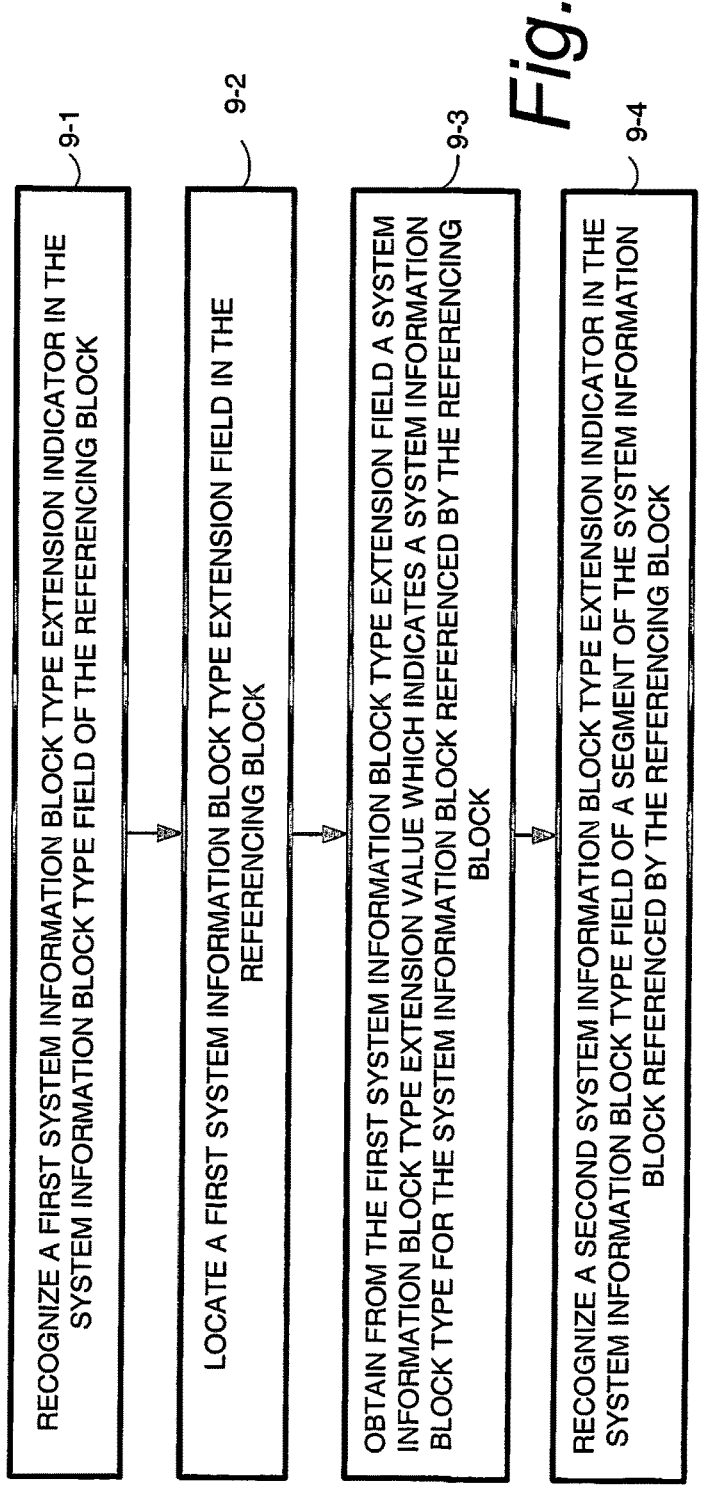
FIG. 9 is a flowchart showing basic example steps performed by a system information processing function of a user equipment unit for processing the referencing block and the system information block of FIG. 7.

FIG. 9 shows basic example steps performed by a system information processing function 102 of user equipment unit 30 for processing the referencing block 110(3) and the system information block 112(3) of FIG. 7. Action 9-1 through action 9-4 of FIG. 9 are essentially the same as action 6-1 through action 6-4 of FIG. 6, and accordingly are not discussed herein. FIG. 9 omits any actions corresponding to actions 6-5 through 6-6 of FIG. 6.

The merits of the second embodiment/mode are as follows: the second embodiment/mode is still fully backwards compatible. Moreover, the second embodiment/mode is more efficient since it involves less overhead in every segment, and also avoids the explosion in ASN.1 type definitions, and the existing scheduling algorithms are not affected.

The second embodiment/mode requires an additional mechanism to allow the scheduling of multiple extended SIB type at the same time and within the same SYSTEM INFORMATION message. The details of which extended SIB type is included in a segment is included in the scheduling information. In case multiple extended SIB types are included in a SYSTEM INFORMATION message, the scheduling information should clarify the SIB type for each of those. This can be done by including additional information in the scheduling information or by defining a fixed rule, e.g., that the order used in the SYSTEM INFORMATION message is the same as the one used in the scheduling information.

Third Embodiment/Mode Extended SIB-type Details Only in Scheduling Information

Figure 10:
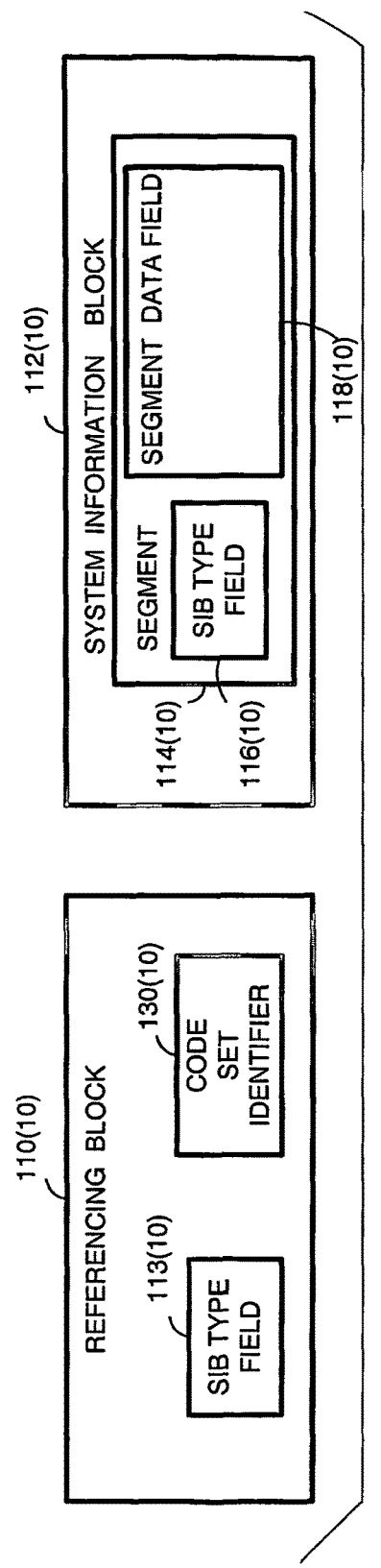
FIG. 10 is a diagrammatic view of referencing block and a system information block generated according to a third embodiment and a third mode.

An example of the third embodiment/mode is illustrated in FIG. 10, which shows both a referencing block 110(10) and a system information block 112(10) generated by the system information extension utility function 100. Fields which are common with the embodiment of FIG. 3 are comparably numbered (with the exception of parenthetical suffixes) and comparably understood with reference to the embodiment of FIG. 3.

In the third embodiment of FIG. 10, for extended SIB types both within the referencing block 110(10) and within the segments 114 of the system information block 112(10) the respective regular SIB type fields 113(10) and 116(10) are used to distinguish the additional SIB types. Within the referencing block 110(10), a regular extension is added including an additional code set field 130(10), indicating how the SIB type should be interpreted. For example, a value 0 in the SIB type field would mean SIB type 1 if a first code set is operative (as indicated by the code set identifier in field 130(10)) and would mean SIB type 20 if a second code set is operative. In this third embodiment/mode, no additional fields are introduced or required within the segments of the system information block 112(10).

Preferably there is one code set field per referencing block or per block that is referenced to be scheduled. This avoids having different code sets being utilized for different system information blocks that are referenced by a referencing block.

In contrast to the first embodiment/mode and the second embodiment/mode, the third embodiment/mode is not backwards compatible since the interpretation of a given SIB type depends on information provided in an extension that earlier mobiles do not support. As a result, these non-supporting mobiles will interpret the information incorrectly. The third embodiment/mode does not really require additional mechanisms to support scheduling of multiple extended SIB type at the same time; within the same SYSTEM INFORMATION message. The only restriction that applies for the third embodiment/mode is that SIBs with the same value within the SIB type field should not be scheduled together. This is not considered to be an acceptable restriction, that could anyhow be resolved in a manner as described for the second embodiment.

FIG. 11 shows basic example steps performed by system information extension utility function 100 in conjunction with the third embodiment/mode. As action 11-1, the system information extension utility function 100 includes, in a system information block type field 116(10) of a system information block 112(10) referenced by a referencing block, a system information block type value. Further, as action 11-2 the system information extension utility function 100 includes, in the referencing block 110(10), a code set identifier which identifies a selected one of plural code sets for use in interpreting the system information block type value included in the system information block type field 116(10) of the system information block referenced by the referencing block. The code set identifier is included in code set identifier field 130(10). For example, a first value for the code set identifier can require that the system information block type value be interpreted in accordance with a range of nominal system information block type values for a predetermined protocol, while a second value for the code set identifier can require that the system information block type value be interpreted in accordance with a range of extended system information block type values, the extended system information block type values being outside the range of nominal system information block type values. The code set identifier field 130(10) can be included in an extension field of the referencing block.

FIG. 12 shows basic example steps performed by a system information processing function 102 of user equipment unit 30 for processing the referencing block 110(10) and the system information block 112(10) of FIG. 10. As action 11-1, the system information processing function 102 obtains, from the system information block type field 116 (10) of a system information block referenced by a referencing block, a system information block type value. As action 11-2, the system information processing function 102 obtains, from the referencing block 110(10), a code set identifier (from code set identifier field 130(10)) which identifies a selected one of plural code sets. As action 11-3, the system information processing function 102 uses the selected one of the plural code sets for interpreting the system information block type value included in the system information block type field 116(10) of the system information block referenced by the referencing block, as well as the (preferably same) the system information block type value included in the system information block type field 113(10) of the referencing block 110(10).

When the protocol blocks belong to a Radio Resource Control (RRC) protocol, the referencing block can be a master information block or a scheduling block. FIG. 13 depicts certain aspects and information elements of a master information block, and references in parenthesis the pertinent sections of the Technical Specification 3GPP TS 25.331 V3.17.0 (2003-12) referring to those information elements. In a master information block, such as that shown in FIG. 13, the system information block type field is an "SIB and SB type" information element.

FIG. 14 depicts certain aspects and information elements of a scheduling block, and references in parenthesis the pertinent sections of the Technical Specification 3GPP TS 25.331 V3.17.0 (2003-12) referring to those information elements. For a scheduling block the system information block type field is an "SIB type SIBS only" information element. For an ordinary system information block, the system information block type field is a "SIB Type" information element.

Accordingly, as utilized herein, it will be understood that the term system information block type field as utilized herein can correspond in terms of Technical Specification 3GPP TS 25.331 V3.17.0 (2003-12) to any one of the appropriate information elements above mentioned, e.g., the "SIB and SB type" information element; the "SIB type SIBS only" information element; or the "SIB Type" information element.

The embodiments and modes described herein permit addition of new system information block types. All mechanisms provide clear and specific ways to add system information blocks, with each embodiment/mode having its own specific merits.

For example, in the first embodiment the segments can still be decoded and processed without considering the scheduling information. The second embodiment tends to be more efficient since it does not involve the additional overhead in every segment, since it avoids the explosion in ASN.1 type definitions, and since it does not affect the existing scheduling algorithms. These same considerations applicable to the second embodiment are also valid for the third embodiment. No additional mechanism is required to support scheduling of multiple extended SIB type at the same time/within the same SYSTEM INFORMATION message.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a node of a telecommunications network which prepares network system information for transmission across an air interface to a user equipment unit, the system information including a system information block type which is included in protocol blocks, the protocol blocks being a system information block and a referencing block, the referencing block being one or both of a master information block and a scheduling block, the protocol blocks in which the system information is included having a system information block type field which includes a system information block type value which corresponds to the system information block type, the system information block comprising one or more segments, comprising the steps of:
   including a first system information block type extension indicator in the system information block type field of the referencing block when the system information block type for a system information block referenced by the referencing block does not have a system information block type value in a nominal range of system information block type values;
   including a first system information block type extension field in the referencing block;
   including in the first system information block type extension field a system information block type extension value which indicates a system information block type for the system information block referenced by the referencing block;
   including a second system information block type extension indicator in the system information block type field of a segment of the system information block referenced by the referencing block; and,
   transmitting a message containing additional network system information in said system information block associated with said system information block type extension value, whereby said user equipment unit can utilize said additional network system information for the management of radio resources.

2. The method of claim 1 further comprises the steps of: including a second system information block type extension field in the segment of the system information block referenced by the referencing block; and, including in the second system information block type extension field the system information block type extension value which indicates the system information block type for the system information block referenced by the referencing block.

3. The method of claim 2, further comprising the step of including the second system information block type extension field in a data field of the segment.

4. The method of claim 3, wherein the protocol blocks belong to a Radio Resource Control (RRC) protocol, and wherein the second system information block type extension field occupies three bits of the data field of the segment.

5. The method of claim 1, wherein the protocol blocks belong to a Radio Resource Control (RRC) protocol, wherein the referencing block is a master information block, and wherein the system information block type field for the master information block is a "SIB and SB type" information element.

6. The method of claim 1, wherein the protocol blocks belong to a Radio Resource Control (RRC) protocol, wherein the referencing block is a scheduling block, and wherein the system information block type field for the scheduling block is a "SIB type SIBS only" information element.

7. The method of claim 1, wherein the protocol blocks belong to a Radio Resource Control (RRC) protocol, and wherein in the system information block the system information block type field includes a "SIB Type" information element.

8. A method for receiving network system information transmitted across an air interface from a network node at a user equipment unit, the system information including a system information block type which is included in protocol blocks, the protocol blocks being a system information block and a referencing block, the protocol blocks in which the system information is included having a system information block type field which includes a system information block type value which corresponds to the system information block type, the system information block comprising one or more segments, comprising the steps of:

receiving a message containing network system information;

recognizing, in said message, a first system information block type extension indicator in the system information block type field of the referencing block when the system information block type for a system information block referenced by the referencing block does not have a system information block type value in a nominal range of system information block type values;

locating a first system information block type extension field in the referencing block;

obtaining from the first system information block type extension field a system information block type extension value which indicates a system information block type for the system information block referenced by the referencing block;

recognizing a second system information block type extension indicator in the system information block type field of a segment of the system information block referenced by the referencing block; and, utilizing additional system information in said system information block associated with said system information block type extension value for the management of radio resources of said user equipment unit.

9. The method of claim 8 further comprising the steps of: locating a second system information block type extension field in the segment of the system information block referenced by the referencing block; and, obtaining from the second system information block type extension field the system information block type extension value which indicates the system information block type for the system information block referenced by the referencing block.

10. The method of claim 1 further comprising the step of: including in the referencing block a code set identifier which identifies a selected one of plural code sets for use in interpreting the system information block type value included in the system information block type field of the system information block referenced by the referencing block.

11. The method of claim 10, wherein:
a first value for the code set identifier requires that the system information block type value be interpreted in accordance with a range of nominal system information block type values for a predetermined protocol; and,
a second value for the code set identifier requires that the system information block type value be interpreted in accordance with a range of extended system information block type values, the extended system information block type values being outside the range of nominal system information block type values.

12. The method of claim 10, further comprising the step of including the code set identifier in an extension field of the referencing block.

13. The method of claim 10, further comprising the step of formatting the system information block and the referencing block in accordance with a predetermined protocol.

14. The method of claim 13, wherein the predetermined protocol is a Radio Resource Control (RRC) protocol.

15. The method of claim 8, further comprising the steps of:
obtaining from the referencing block, a code set identifier which identifies a selected one of plural code sets; and,
using the selected one of the plural code sets for interpreting the system information block type value included in the system information block type field of the system information block referenced by the referencing block.

16. The method of claim 15, wherein:
a first value for the code set identifier requires that the system information block type value be interpreted in accordance with a range of nominal system information block type values for a predetermined protocol; and,
a second value for the code set identifier requires that the system information block type value be interpreted in accordance with a range of extended system information block type values, the extended system information block type values being outside the range of nominal system information block type values.

17. The method of claim 15, further comprising the step of obtaining the code set identifier from an extension field of the referencing block.

18. The method of claim 15 further comprising the step of deformating the system information block and the referencing block in accordance with a predetermined protocol.

19. The method of claim 18, wherein the predetermined protocol is a Radio Resource Control (RRC) protocol.

20. The method of claim 8, wherein the protocol blocks belong to a Radio Resource Control (RRC) protocol, and wherein the referencing block is a master information block, and wherein the system information block type field for the master information block is a "SIB and SB type" information element.

21. The method of claim 8, wherein the protocol blocks belong to a Radio Resource Control (RRC) protocol, and wherein the referencing block is a scheduling block, and wherein the system information block type field for the scheduling block is a "SIB type SIBS only" information element.

22. The method of claim 8, wherein the protocol blocks belong to a Radio Resource Control (RRC) protocol, and wherein in the system information block the system information block type field includes a "SIB Type" information element.

23. A user equipment unit which receives network system information transmitted across an air interface from a network node, the system information including a system information block type which is included in protocol blocks, the protocol blocks being a system information block and a referencing block, the protocol blocks in which the system information is included having a system information block type field which includes a system information block type value which corresponds to the system information block type, the system information block including one or more segments, comprising:
means for receiving a message containing network system information;
means for recognizing, in said message, a first system information block type extension indicator in the system information block type field of the referencing block when the system information block type for a system information block referenced by the referencing block does not have a system information block type value in a nominal range of system information block type values;
means for locating a first system information block type extension field in the referencing block;
means for obtaining from the first system information block type extension field a system information block type extension value which indicates a system information block type for the system information block referenced by the referencing block;
means for recognizing a second system information block type extension indicator in the system information block type field of a segment of the system information block referenced by the referencing block; and,
means for utilizing additional system information in said system information block associated with said system information block type extension value for the management of radio resources of said user equipment unit.

24. The user equipment unit of claim 23 further comprising:
means for locating a second system information block type extension field in the segment of the system information block referenced by the referencing block; and,
means for obtaining from the second system information block type extension field the system information block type extension value which indicates the system information block type for the system information block referenced by the referencing block.

25. The user equipment unit of claim 24 further comprising:
means for obtaining, from the referencing block, a code set identifier which identifies a selected one of plural code sets; and,
means for using the selected one of the plural code sets for interpreting the system information block type value included in the system information block type field of the system information block referenced by the referencing block.

26. The user equipment unit of claim 25, wherein;
a first value for the code set identifier requires that the system information block type value be interpreted in accordance with a range of nominal system information block type values for a predetermined protocol; and,
a second value for the code set identifier requires that the system information block type value be interpreted in accordance with a range of extended system information block type values, the extended system information block type values being outside the range of nominal system information block type values.

27. A method for communicating network system information across an air interface between a network node and a user equipment unit, the system information including a system information block type which is included in protocol blocks, the protocol blocks being a system information block and a referencing block, the protocol blocks in which the system information is included having a system information block type field which includes a system information block type value which corresponds to the system information block type, the system information block comprising one or more segments, comprising the steps of:
in said network node, including a first system information block type extension indicator in the system information block type field of the referencing block when the system information block type for a system information block referenced by the referencing block does not have a system information block type value in a nominal range of system information block type values;
including a first system information block type extension field in the referencing block;
including in the first system information block type extension field a system information block type extension value which indicates a system information block type for the system information block referenced by the referencing block;
including a second system information block type extension indicator in the system information block type field of a segment of the system information block referenced by the referencing block; and,
transmitting the referencing block and the system information block from the network node to the user equipment unit;
in said user equipment unit, recognizing that the first system information block type extension indicator in the system information block type field of the received referencing block when the system information block type for the system information block referenced by the referencing block does not have a system information block type value in the nominal range of system information block type values;
locating the first system information block type extension field in the referencing block;
obtaining from the first system information block type extension field the system information block type extension value which indicates the system information block type for the system information block referenced by the referencing block;

recognizing the second system information block type extension indicator in the system information block type field of a segment of the system information block referenced by the referencing block; and, utilizing additional system information in said system information block associated with said system information block type extension value for the management of radio resources of said user equipment unit.

\* \* \* \* \*